(12) United States Patent
Sharma et al.

(10) Patent No.: US 12,014,526 B2
(45) Date of Patent: Jun. 18, 2024

(54) SYSTEM, METHOD, AND APPARATUS FOR GENERATING TOKENIZED IMAGES

(71) Applicant: Visa International Service Association, San Francisco, CA (US)

(72) Inventors: Varun Sharma, Foster City, CA (US); Nicholas Cai, Fremont, CA (US); Walker Carlson, San Diego, CA (US); Ajit Vilasrao Patil, Singapore (SG)

(73) Assignee: Visa International Service Association, San Francisco, CA (US)

(*) Notice: Subject to any disclaimer, the term of this patent is extended or adjusted under 35 U.S.C. 154(b) by 325 days.

(21) Appl. No.: 17/293,057

(22) PCT Filed: Nov. 16, 2018

(86) PCT No.: PCT/US2018/061470
§ 371 (c)(1),
(2) Date: May 12, 2021

(87) PCT Pub. No.: WO2020/101696
PCT Pub. Date: May 22, 2020

(65) Prior Publication Data
US 2021/0407141 A1 Dec. 30, 2021

(51) Int. Cl.
*G06T 9/00* (2006.01)
*G06F 21/16* (2013.01)
(Continued)

(52) U.S. Cl.
CPC .............. *G06T 9/00* (2013.01); *G06F 21/16* (2013.01); *G06F 21/602* (2013.01);
(Continued)

(58) Field of Classification Search
CPC ......... G06T 9/00; G06F 21/16; G06F 21/602; G06Q 20/027; G06Q 20/065; G06Q 20/3274; G06Q 20/382; G06Q 20/38215; G06Q 20/3829; G06Q 20/385; H04N 19/467; H04N 21/23473; H04N 21/2351; H04N 21/8153
See application file for complete search history.

(56) References Cited

U.S. PATENT DOCUMENTS

2007/0162961 A1   7/2007 Tarrance et al.
2011/0251910 A1* 10/2011 Dimmick ............... G06Q 20/12
                                                               705/17
(Continued)

FOREIGN PATENT DOCUMENTS

CN        105378782 A        3/2016

*Primary Examiner* — Nay A Maung
*Assistant Examiner* — Jose M Torres
(74) *Attorney, Agent, or Firm* — The Webb Law Firm

(57) ABSTRACT

Provided is a system and computer-implemented method for encoding account tokens in image files. The method includes receiving, from a user associated with an account identifier, an identification of at least one image, generating at least one token based on the account identifier of the user, encoding the at least one token in the at least one image, resulting in at least one tokenized image, and communicating the at least one tokenized image to a transaction processing system, wherein the transaction processing system is configured to conduct a transaction based on the tokenized image.

18 Claims, 4 Drawing Sheets

(51) Int. Cl.
  *G06F 21/60* (2013.01)
  *G06Q 20/02* (2012.01)
  *G06Q 20/06* (2012.01)
  *G06Q 20/32* (2012.01)
  *G06Q 20/38* (2012.01)
  *H04N 21/235* (2011.01)

(52) U.S. Cl.
  CPC ......... *G06Q 20/027* (2013.01); *G06Q 20/065* (2013.01); *G06Q 20/3274* (2013.01); *G06Q 20/382* (2013.01); *G06Q 20/38215* (2013.01); *G06Q 20/3829* (2013.01); *G06Q 20/385* (2013.01); *H04N 21/2351* (2013.01)

(56) References Cited

U.S. PATENT DOCUMENTS

| | | |
|---|---|---|
| 2014/0297439 A1 | 10/2014 | Hasson et al. |
| 2014/0341374 A1* | 11/2014 | Thozhuvanoor ... G06Q 20/3274 380/28 |
| 2015/0006390 A1 | 1/2015 | Aissi et al. |
| 2015/0100495 A1 | 4/2015 | Salama et al. |
| 2016/0239892 A1 | 8/2016 | Kim et al. |
| 2017/0024723 A1 | 1/2017 | Filler |
| 2019/0236592 A1* | 8/2019 | Arora ................. G06Q 20/3829 |
| 2020/0036528 A1* | 1/2020 | Ortiz ........................ G06N 3/04 |
| 2020/0097928 A1* | 3/2020 | Dresner ............... G06Q 20/023 |
| 2021/0312080 A1* | 10/2021 | Ramamurthy ...... G06F 21/6245 |

\* cited by examiner

SYSTEM, METHOD, AND APPARATUS FOR GENERATING TOKENIZED IMAGES

CROSS-REFERENCE TO RELATED APPLICATION

This application is the United States national phase of International Application No. PCT/US2018/061470 filed Nov. 16, 2018, the disclosure of which is hereby incorporated by reference in its entirety.

BACKGROUND

1. Field

This disclosure relates generally to image encoding and, in one non-limiting embodiment, to a system, method, and apparatus for generating tokenized images.

2. Technical Considerations

Consumers may find items within or outside a retail environment, such as a store, they wish to purchase. It can be difficult to identify the item and where to purchase the item based on merely observing the item. Consumers must therefore spend time searching, inquiring, and investigating the item and the availability of the item.

Moreover, tokenized payments risk exposure of a payment token which, if compromised, could be used by thieves to conduct unauthorized transactions. Every time a payment token is communicated there is a risk that it is exposed. For example, a payment token may be exposed while it is provisioned on a user's phone, while it is being communicated to a payment gateway or transaction processing system, or while it is being communicated to some other user for authorized use.

SUMMARY

In non-limiting embodiments, provided is a computer-implemented method for encoding account tokens in image files, including: receiving, from a user associated with an account identifier, an identification of at least one image; generating, with at least one processor, at least one token based on the account identifier of the user; encoding, with at least one processor, the at least one token in the at least one image, resulting in at least one tokenized image; and communicating, with at least one processor, the at least one tokenized image to a transaction processing system, wherein the transaction processing system is configured to conduct a transaction based on the tokenized image.

In non-limiting embodiments, the method further includes extracting, with at least one processor, the at least one token from the tokenized image; and conducting, with at least one processor, a transaction based on the at least one token. In non-limiting embodiments, encoding the at least one token comprises encoding the at least one token into RGB values of the at least one image. In non-limiting embodiments, encoding the at least one token comprises: encrypting the at least token to produce encrypted data and encoding the encrypted data into the at least one image. In non-limiting embodiments, the method further includes generating at least one false token and encoding the at least one false token into the at least one image. In non-limiting embodiments, the method further includes detecting a transaction request using a false token and automatically deactivating the payment token in response to detecting the transaction request using the false token.

In non-limiting embodiments, the method further includes capturing an image with a camera of a client device and generating the at least one image based on the image. In non-limiting embodiments, the at least one image is a screenshot or an image downloaded from a webpage. In non-limiting embodiments, the at least one image comprises embedded merchant data or product data. In non-limiting embodiments, the method further includes communicating, with at least one processor of a first client device, the at least one tokenized image to a second client device including at least one processor, wherein the at least one processor of the second client device communicates the at least one tokenized image to the transaction processing system.

According to non-limiting embodiments, provided is a system for encoding account tokens in image files, comprising at least one processor programmed or configured to: receive, from a user associated with an account identifier, an identification of at least one image; generate at least one token based on the account identifier of the user; embed the at least one token in the at least one image, resulting in at least one tokenized image; and communicate the at least one tokenized image to a transaction processing system, wherein the transaction processing system is configured to conduct a transaction based on the tokenized image.

In non-limiting embodiments, the system further includes the transaction processing system, wherein the transaction processing system is programmed or configured to: extract the at least one token from the tokenized image; and conduct a transaction based on the at least one token. In non-limiting embodiments, encoding the at least one token comprises encoding the at least one token into RGB values of the at least one image. In non-limiting embodiments, the at least one processor embeds the at least one token by: encrypting the at least token to produce encrypted data; and encoding the encrypted data into the at least one image. In non-limiting embodiments, the at least one processor is further programmed or configured to generate at least one false token and encode the at least one false token into the at least one image.

In non-limiting embodiments, the at least one processor is further programmed or configured to detect a transaction request using a false token and automatically deactivate the payment token in response to detecting the transaction request using the false token. In non-limiting embodiments, the system further includes a client device including the at least one processor, wherein the at least one processor is further programmed or configured to: capture a photograph with a camera of the client device and generate the at least one image based on the photograph. In non-limiting embodiments, the at least one image is a screenshot or an image downloaded from a webpage. In non-limiting embodiments, the at least one image comprises embedded merchant data or product data. In non-limiting embodiments, the at least one processor is further programmed or configured to communicate the at least one tokenized image to a second client device including at least one processor, wherein the at least one processor of the second client device communicates the at least one tokenized image to the transaction processing system.

According to a further non-limiting embodiment, provided is a computer program product for encoding account tokens in image files, comprising at least one non-transitory computer-readable medium including program instructions that, when executed by at least one processor, cause the at least one processor to: receive, from a user associated with an account identifier, an identification of at least one image; generate at least one token based on the account identifier of the user; embed the at least one token in the at least one image, resulting in at least one tokenized image; and communicate the at least one tokenized image to a transaction processing system, wherein the transaction processing system is configured to conduct a transaction based on the tokenized image.

Other non-limiting embodiments or aspects will be set forth in the following numbered clauses:

Clause 1: A computer-implemented method for encoding account tokens in image files, comprising: receiving, from a user associated with an account identifier, an identification of at least one image; generating, with at least one processor, at least one token based on the account identifier of the user; encoding, with at least one processor, the at least one token in the at least one image, resulting in at least one tokenized image; and communicating, with at least one processor, the at least one tokenized image to a transaction processing system, wherein the transaction processing system is configured to conduct a transaction based on the tokenized image.

Clause 2: The computer-implemented method of clause 1, further comprising: extracting, with at least one processor, the at least one token from the tokenized image; and conducting, with at least one processor, a transaction based on the at least one token.

Clause 3: The computer-implemented method of clauses 1 or 2, wherein encoding the at least one token comprises encoding the at least one token into RGB values of the at least one image.

Clause 4: The computer-implemented method of any of clauses 1-3, wherein encoding the at least one token comprises: encrypting the at least one token to produce encrypted data; and encoding the encrypted data into the at least one image.

Clause 5: The computer-implemented method of any of clauses 1-4, further comprising: generating at least one false token; and encoding the at least one false token into the at least one image.

Clause 6: The computer-implemented method of any of clauses 1-5, further comprising: detecting a transaction request using a false token; and automatically deactivating the at least one token in response to detecting the transaction request using the false token.

Clause 7: The computer-implemented method of any of clauses 1-6, further comprising: capturing an image with a camera of a client device; and generating the at least one image based on the at least one image.

Clause 8: The computer-implemented method of any of clauses 1-7, wherein the at least one image is a screenshot or an image downloaded from a webpage.

Clause 9: The computer-implemented method of any of clauses 1-8, wherein the at least one image comprises embedded merchant data or product data.

Clause 10: The computer-implemented method of any of clauses 1-9, further comprising communicating, with at least one processor of a first client device, the at least one tokenized image to a second client device including at least one processor, wherein the at least one processor of the second client device communicates the at least one tokenized image to the transaction processing system.

Clause 11: A system for encoding account tokens in image files, comprising at least one processor programmed or configured to: receive, from a user associated with an account identifier, an identification of at least one image; generate at least one token based on the account identifier of the user; embed the at least one token in the at least one image, resulting in at least one tokenized image; and communicate the at least one tokenized image to a transaction processing system, wherein the transaction processing system is configured to conduct a transaction based on the tokenized image.

Clause 12: The system of clause 11, further comprising the transaction processing system, wherein the transaction processing system is programmed or configured to: extract the at least one token from the tokenized image; and conduct a transaction based on the at least one token.

Clause 13: The system of clauses 11 or 12, wherein encoding the at least one token comprises encoding the at least one token into RGB values of the at least one image.

Clause 14: The system of any of clauses 11-13, wherein the at least one processor embeds the at least one token by: encrypting the at least one token to produce encrypted data; and encoding the encrypted data into the at least one image.

Clause 15: The system of any of clauses 11-14, wherein the at least one processor is further programmed or configured to: generate at least one false token; and encode the at least one false token into the at least one image.

Clause 16: The system of any of clauses 11-15, wherein the at least one processor is further programmed or configured to: detect a transaction request using a false token; and automatically deactivate the at least one token in response to detecting the transaction request using the false token.

Clause 17: The system of any of clauses 11-16, further comprising a client device including the at least one processor, wherein the at least one processor is further programmed or configured to: capture a photograph with a camera of the client device; and generate the at least one image based on the photograph.

Clause 18: The system of any of clauses 11-17, wherein the at least one image is a screenshot or an image downloaded from a webpage.

Clause 19: The system of any of clauses 11-18, wherein the at least one image comprises embedded merchant data or product data.

Clause 20: The system of any of clauses 11-19, wherein the at least one processor is further programmed or configured to communicate the at least one tokenized image to a second client device including at least one processor, wherein the at least one processor of the second client device communicates the at least one tokenized image to the transaction processing system.

Clause 21: A computer program product for encoding account tokens in image files, comprising at least one non-transitory computer-readable medium including program instructions that, when executed by at least one processor, cause the at least one processor to: receive, from a user associated with an account identifier, an identification of at least one image; generate at least one token based on the account identifier of the user; embed the at least one token in the at least one image, resulting in at least one tokenized image; and communicate the at least one tokenized image to a transaction processing system, wherein the transaction processing system is configured to conduct a transaction based on the tokenized image.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION OF THE PREFERRED EMBODIMENTS

Figure 1:
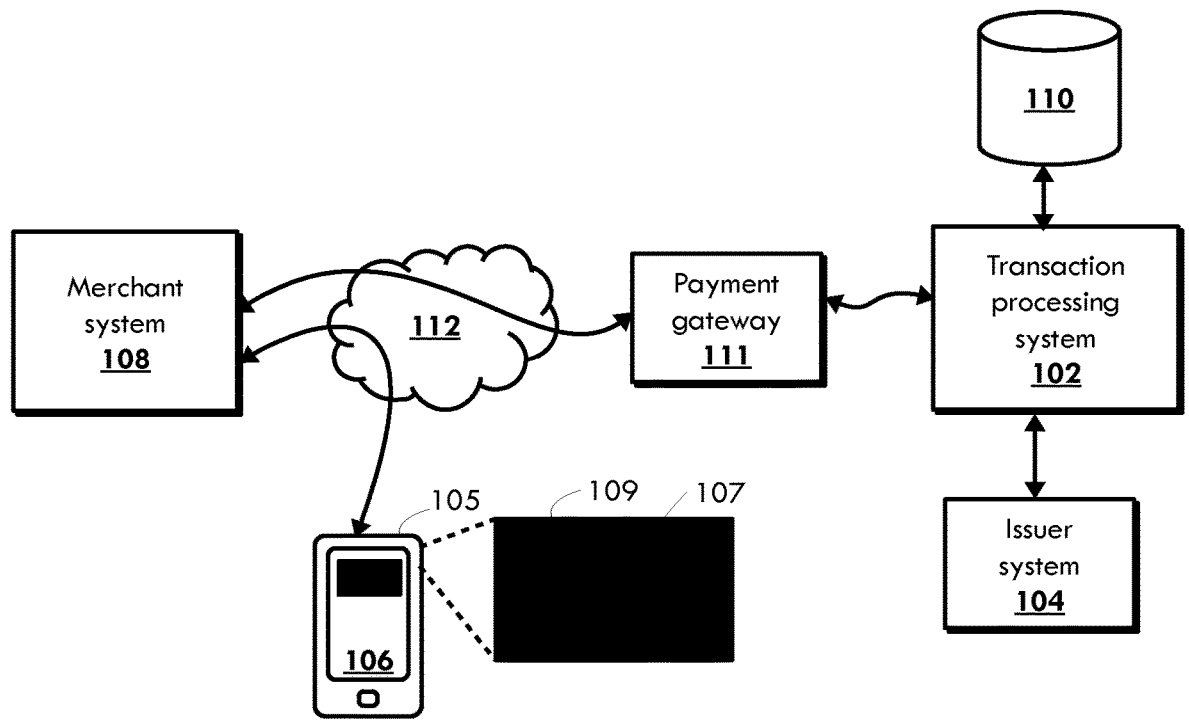
FIG. 1 is a schematic diagram of a system for generating tokenized images according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider. A token service may include one or more computer systems and/or applications for generating tokens corresponding to user accounts issued by one or more issuer institutions.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "user device" may refer to one or more electronic devices configured to communicate with one or more networks. As an example, a user device may include a desktop computer, cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), a POS system, a network-capable appliance (e.g., a television, automobile, wash machine, thermostat, refrigerator, etc.), and/or other like devices.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of a system and method for generating a tokenized image allow for a user to seamlessly purchase a product by capturing an image of it. Using a unique token generation process to generate a tokenized image, the image of the product being purchased may be used and processed as a payment token for that transaction. In this manner, users can share tokenized images among each other as a means of authorizing transactions and/or providing gifts, and users do not risk exposing their original account identifiers when conducting the transaction. This provides enhanced security for the transaction and increased protection for the privacy of a user's account identifier and associated payment tokens. Various other advantages are provided and discussed herein.

Referring now to FIG. 1, a system 1000 for generating a tokenized image is shown according to non-limiting embodiments. A user device 105 is in communication with a merchant system 108 through a network environment 112, such as the Internet or a local network, or may be in communication via radio frequency or the like. The merchant system 108 may include, for example, a merchant POS system, a merchant web server, an e-commerce system operated on behalf of the merchant, and/or the like. The merchant system 108 is in communication with a transaction processing system 102 through the network environment 112 or some other network environment. In some examples, the merchant system 108 is in communication with the transaction processing system 102 via a payment gateway 111 such as, but not limited to, an acquirer system or a third-party gateway. The transaction processing system 102 is in communication with an account database 110 and one or more issuer systems 104. It will be appreciated that other arrangements are possible for implementing non-limiting embodiments of a system for generating a tokenized image.

Still referring to FIG. 1, a user of the user device 105 may seek to purchase an item 107. The item 107 may be an item on a shelf of a retail store, an item identified by the user in any physical environment, an item identified by the user on a website, mobile application, or virtual environment, and/or the like. For example, a user may see an item 107 in use within or outside a retail environment. The user may take a photograph of the item 107 using a camera of the user device 105. The user may also take a screenshot on their user device 105 of a webpage or graphical user interface (GUI) that shows the item 107. Taking a photograph of the item 107 results in an image 109 of the item 107 that may be stored as one or more files on the user device 105 or on a remote system in communication with the user device 105. The user device 105 may execute an application, such as an electronic wallet application, a merchant application, an issuer application, and/or the like, that presents one or more GUIs 106 on the user device 105 configured to receive an identification of an image (e.g., selection of a file, a URL, a screenshot, or the like) and/or capture a photograph.

With continued reference to FIG. 1, in some non-limiting embodiments, the image 109 is communicated from the user device 105 to the merchant system 108 or some other remote system in order to identify the item 107 and information corresponding to the item 107. For example, the user device 105 or an application executing thereon may utilize one or more Application Programming Interfaces (APIs) to query one or more merchant systems 108, central databases, third-party services, and/or the like, to identify the item 107. The item 107 may be identified by image processing and recognition techniques known to those skilled in the art. For example, the image 109 may be processed to identify the contours of the item 107, generate a feature vector, and compare the feature vector to feature vectors for known items using one or more machine learning algorithms. In some examples, optical character recognition (OCR) techniques may be used to process text on labels or item packaging and determine the item 107 from that information. As another example, metadata for a captured screenshot or webpage, a visible URL or text on a screenshot or webpage, and/or the like may be analyzed and used to determine the item 107. Various other techniques may be used to identify the item 107. In some non-limiting embodiments, images 109 from an online source, such as a social media service, may be associated with one or more tags that identify the item 107. Merchants may, in some examples, provide images 109 through their webpages, social media feeds, or advertisements that include embedded metadata to facilitate the identification of the item 107. Various other techniques may be used. The item 107 may be identified by a name, a Universal Product Code (UPC), a description, a brand, and/or the like.

Still referring to FIG. 1, once the item 107 is identified, information for the item 107 is determined. For example, one or more merchants may be determined that sell the item 107, including a price for the item 107, an availability for the item 107, a shipping time, and/or the like. In some non-limiting examples where a single merchant system 108 is queried, a determination may be made if the item 107 is available from that merchant. In some non-limiting embodiments, if it is determined that the item 107 is unavailable, one or more replacement items may be identified. In non-limiting embodiments in which multiple items and/or merchants are identified, the user may be presented with options through a GUI 106 to select an item for purchase and/or a merchant to make that purchase from. It will be appreciated that information for the item 107 may be queried from a central database having information concerning a plurality of items, queried from a specific database for that item 107 or type of item, or dynamically determined based on one or more web bots and/or historical transaction information from other users. In some examples, information for the item 107 may be determined by the image 109 itself via text on or near the item 107, a geolocation of the user device when capturing the image 109, metadata associated with the image 109, or other contextual information.

With continued reference to FIG. 1, once the item 107 is identified and information corresponding to the item 107 is determined, a payment token is generated, received, or identified. In some non-limiting embodiments, the user device 105 will have a payment token stored thereon, which may have been provisioned to the user device 105 by an issuer system 104, an electronic wallet provider, or the like. In other non-limiting embodiments, the user device 105 may communicate with a remote system, such as the issuer system 104, transaction processing system 102, a token service, or the like to obtain a payment token corresponding to an account of the user. The payment token may be an alphanumeric identifier that can be used like a PAN or other account identifier. In some non-limiting examples, the payment token may be a limited use token that can be used for a single use, single purchase, a limited number of uses and purchases, one or more uses from a particular merchant, or the like.

Still referring to FIG. 1, once a payment token is obtained, various techniques may be used to generate a tokenized image based on a payment token and an image 109 of the item 107. For example, the payment token may be encoded into the image data underlying the image 109. This may be done, for example, using any steganographic techniques known to those skilled in the art. In some non-limiting embodiments, for example, the color space information associated with the image 109 may be modified by adjusting color space values at a predetermined location in the image data based on the payment token. For example, RGB values at the beginning, middle, end, or random location in the image data may be adjusted by a numerical value corresponding to each character, digit, or bit of the payment token. A payment token may also be encoded into image data using a CMYK color model, as another example. In some examples, color space values associated with an individual pixel or block of pixels may be adjusted based on character values of the payment token. It will be appreciated that any type of image file, whether compressed (e.g., JPEG, TIFF, PNG, etc.) or uncompressed (e.g., BMP), may be encoded with a payment token using steganographic techniques.

In some non-limiting embodiments, one or more false payment tokens may be encoded in the tokenized image along with the actual payment token. In this manner, theft of the payment token is made more difficult because a potential thief will not know which token is the actual payment token. In examples where a thief may have access to the original image, image analysis techniques could reveal which pixels have been altered. Accordingly, including false payment tokens or randomly adjusting other image data values can mislead a potential thief and increase the security of the tokenized image. The false tokens may also be associated with an alarm event such that, if one or more of the false tokens are used to conduct a transaction, the alarm event is triggered. In non-limiting embodiments, the alarm event may be notifying the user, notifying the issuer or another party, flagging an account for fraud, flagging a device for fraud, and/or automatically deactivating the actual payment token that was also encoded into the image.

In non-limiting embodiments, the tokenized image is generated through least significant bit (LSB) steganography and false tokens. For example, an N number of tokens may be generated where N–1 tokens are false tokens and 1 token is the actual token. In an RGB implementation, where each pixel is associated with three bytes, one for each of R (red), G (green), and B (blue), the N tokens may be encoded into the last bit of each RGB value. As an example, a bit value may be encoded into one bit of each RGB byte, such as the LSB or another bit. In this manner, each pixel may have three bits encoded therein. However, it will be appreciated that various other methods are possible and that any number of bits may be encoded into any number of pixels or color space values.

The encodings may be duplicated in some non-limiting embodiments. In some non-limiting embodiments, each of the portions of image data in which the payment token information will be encoded may be randomized in order to prevent reverse analysis by examining modified bits. The order of the tokens (e.g., the placement of the actual payment token among the false tokens) may be predetermined or may be based on one or more intrinsic image qualities or image parameters. For example, the size, aspect ratio, color range, contrast level, brightness, or the like may be used to influence the order of the tokens in the image such that a transaction processing system having a configured algorithm is able to process the image, determine the qualities or parameters, and identify the correct payment token in the image. As another example, a color value for a predetermined pixel or block of pixels may be used to determine an order of tokens.

In non-limiting embodiments, one or more cryptographic techniques may also be used to encrypt the payment token that is encoded into the image 109 and/or to encrypt the image 109 itself. For example, the image 109 may be encrypted with elliptical curve cryptography or other asymmetric techniques, symmetric cryptography, or a combination of both. Moreover, the image 109 may be processed with one or more consensus algorithms (e.g., a spline consensus algorithm) to prevent transmission loss. It will be appreciated that various other techniques may be used, such as calculating a cyclic redundancy check (CRC) for the image 109.

The tokenized image may be used by the user to conduct a transaction or may be shared with another user to allow that user to conduct a transaction. For example, the tokenized image may be communicated in an email, text message, social media message, or the like and used by anyone to conduct a transaction. In non-limiting embodiments in which the payment token is a limited use token, the tokenized image may be usable only for conducting a particular transaction, such as a transaction for the particular item, with a particular merchant, by a particular user, for or less than a particular value, etc. In this manner, the tokenized image may be provided as a gift to another user instead of gifting the physical item.

With continued reference to FIG. 1, in non-limiting embodiments, the tokenized image may be communicated from the user device 105 or another user device that received the tokenized image to the merchant system 108 to make a purchase. For example, the tokenized image may be scanned from a user device at a POS system, may be wirelessly communicated at a POS system via radio frequency or by any other means, may be uploaded from a user device to the merchant system 108, or may be provided to the merchant system 108 in any other manner. The merchant system 108 may then generate and communicate a transaction request to the transaction processing system 102 directly or through a payment gateway 111. The transaction processing system 102, issuer system 104, or some other service may decrypt the tokenized image if it was encrypted, identify and extract the payment token in the tokenized image, and use the extracted payment token to complete the transaction. It will be appreciated that the tokenized image may be processed by any entity, including but not limited to a separate token service, the payment gateway 111, the transaction processing system 102, the merchant system 108, the issuer system 104, and/or any combination of such systems.

In non-limiting embodiments, one or more smart contracts may be utilized in a blockchain network to make a payment using a tokenized image. For example, a node of a blockchain network may process a transaction request including the tokenized image, a merchant identifier, and a user identifier by first decrypting the tokenized image, if it is encrypted, and authenticate both the merchant and the user via public-private key cryptography. In this manner, the tokenized image may be pushed to and stored on the blockchain network to encapsulate various parameters of the transaction and other metadata into one secure package of data. Performing the processing on the blockchain network ensures an added integrity and violation check among the tasks being performed by the nodes. The data may include a digital signature establishing that the user and/or merchant possess public keys corresponding to public keys identified in the transaction request. Then, a smart contract may be created between the user and the merchant for the purchase. In some non-limiting embodiments, the tokenized image may also include a separate authentication token, PIN, or password for authenticating the user for the smart contract.

Payment may occur through the smart contract in any number of ways. For example, the smart contract may include logic that triggers a payment using the tokenized image (and the payment token encoded therein) in response to the merchandise being shipped and/or received. In other examples, the merchant may initiate a standard transaction using the extracted account identifier and the settlement of that transaction may complete the smart contract. As another example, the payment may be initiated by the user upon receiving the purchase, such as by effectuating a push payment by scanning a QR code or other data carrier including payment information for the merchant. In this manner, the smart contract may be completed when the push payment is made. Various other arrangements are possible to utilize a smart contract and a blockchain network to securely effectuate transactions using the tokenized image.

Figure 2:
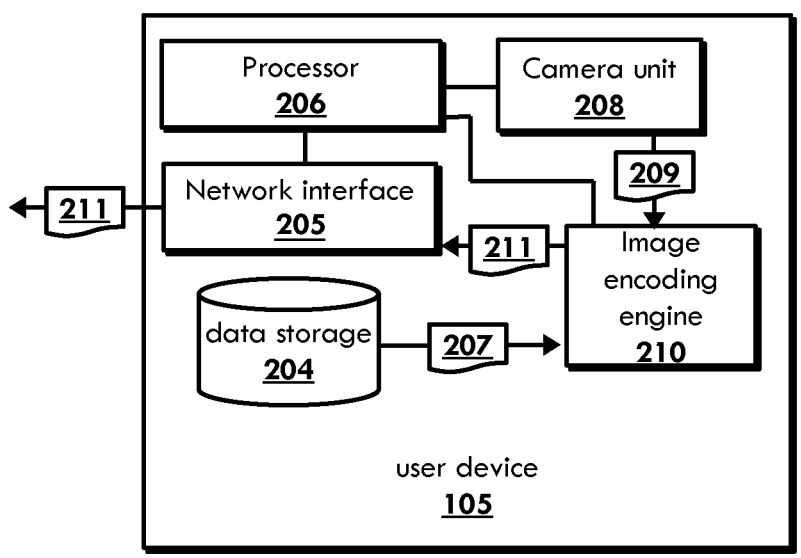
FIG. 2 is a schematic diagram of a client device used in a system for generating tokenized images according to non-limiting embodiments.

Referring now to FIG. 2, a user device 105 is shown according to non-limiting embodiments. The user device 105 includes a processor 206 in communication with a network interface 205, a camera unit 208, and an image encoding engine 210. The image encoding engine 210 may be one or more functions of a mobile application executable by the user device 105, such as an electronic wallet application, may be an independent mobile application, and/or may be an application in communication with a remote system that provides the image encoding engine 210 as Software-as-a-Service (SaaS). It will be appreciated that various other arrangements are possible and that the components of the user device 105 shown in FIG. 2 are for example purposes only. The user device 105 may also include data storage (memory) 204, a display device (not shown), an input device (not shown), transponder (not shown), and/or other components.

With continued reference to FIG. 2, the camera unit 208 of the user device 105 is used to capture an image 209 which is inputted into the image encoding engine 210. A token 207 stored on memory 204 is also inputted into the image encoding engine 210. The token 207 may also be stored elsewhere, generated upon request, or the like. The image encoding engine 210 then generates a tokenized image 211 based on the image 209 and the token 207 and communicates the tokenized image 211 to a remote system via the network interface 205. For example, the tokenized image 211 may be communicated to a merchant system, payment gateway, transaction processing system, issuer system, another user device, and/or the like. In some non-limiting embodiments, the tokenized image 211 may be stored on the data storage device 204 for later usage by the user device 105 and communicated to a local POS system via a transponder (not shown in FIG. 2) or by some other means to request a transaction.

In non-limiting embodiments, multiple tokenized images may be used for each item of multiple items purchased from a merchant. For example, non-limiting embodiments may be used in a merchant retail location by taking images of items as they are placed in a shopping cart or basket. In some examples, a user device may be used to take the images and, in other examples, one or more merchant devices arranged in the retail location and/or in or in the cart or basket may be used. In some non-limiting embodiments, tokenized images may be generated for each item as they are retrieved or as the user exits the retail location. By generating separate tokenized images for each item, the merchant and other entities involved in the transaction can more easily process a return or payment reversal, reduce fraud, and increase the ability to track transaction activity. Moreover, separate tokenized images allows for the transaction processing system to attribute payments for multiple items in a shopping cart to individual line items corresponding to individual items, thereby providing the transaction processing system with enhanced, line item data that it may not ordinarily have access to. The tokenized images may be utilized to conduct a transaction with a remote POS system upon the user exiting the retail location, as determined by one or more sensors in the retail location, a location of the user device, or the like. Moreover, one or more merchant cameras or sensors may be used to confirm what the user retrieved and purchased to ensure that the user is not taking more than was purchased. Further, the location of the user device, as determined based on GPS data, WiFi® data, cell data, or by any other means, may be used to determine what merchant location the user is shopping at such that the user device can identify the correct merchant system to conduct the transaction.

Figure 3:
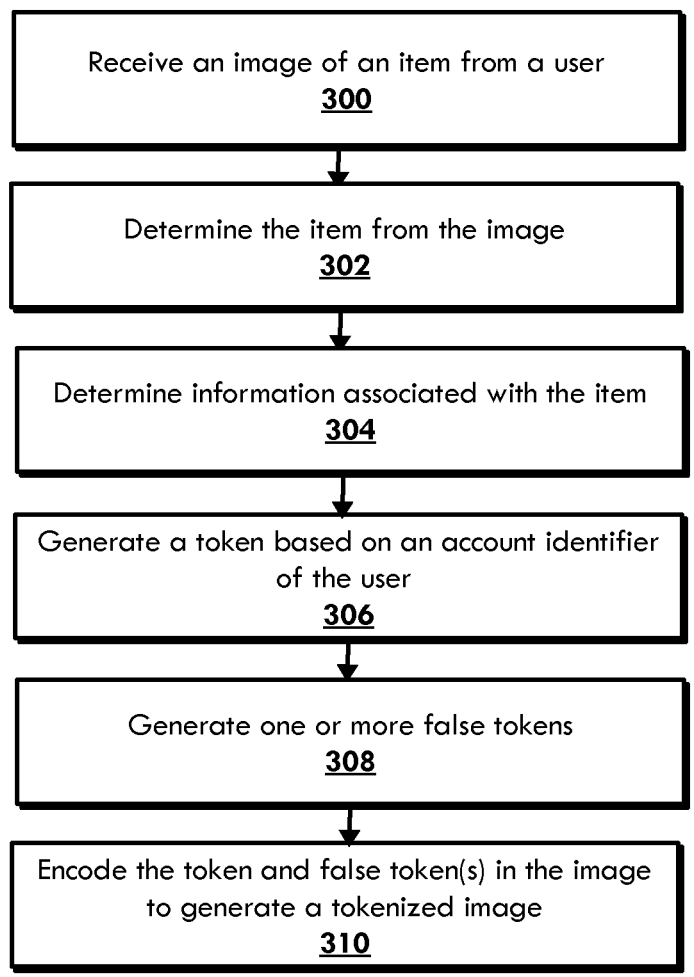
FIG. 3 is a flow diagram of a method for generating tokenized images according to non-limiting embodiments.

Referring now to FIG. 3, a method for generating a tokenized image is shown according to non-limiting embodiments. At a first step 300, an image of an item is received from a user. This may include a user selecting an image from a file menu, the user taking a photograph with a camera, the user capturing a screenshot, the user inputting a URL for the image, and/or the like. It will be appreciated that, in non-limiting embodiments, the image may not be an image of the item but may instead be any type of image. At step 302, in embodiments in which the image is of the item, the item may be determined based on the image. For example, one or more image processing techniques and/or optical character recognition techniques may be used to determine the item depicted in the image. As explained herein, the item may be determined from a central database, a plurality of merchant databases, or in any other like manner. At step 304, information associated with the item is determined. For example, one or more merchants providing the item for sale may be determined, the price of each item may be determined, purchase options may be determined (e.g., type, model, color, etc.), and/or the like. As explained herein, the information associated with the item may be determined in any manner.

With continued reference to FIG. 3, at step 306, a payment token is generated based on an account identifier of the user. In some non-limiting examples, the payment token may be generated in advance and provisioned to a client device possessed by the user. In some non-limiting examples, the payment token may be generated after the image is received at step 300. The payment token may be generated based on an account identifier of the user by a transaction processing system, an issuer system, or a separate token service. At step 308, one or more false payment tokens are generated. As an example, one or more payment tokens of the same size and structure of the actual payment token may be generated by the client device, a transaction processing system, an issuer system, or a separate token service. At step 310, the actual payment token and the false token(s) are encoded in the image using steganographic techniques. It will be appreciated that, in some non-limiting embodiments, the payment token may be encoded into the image without any false tokens.

Figure 4:
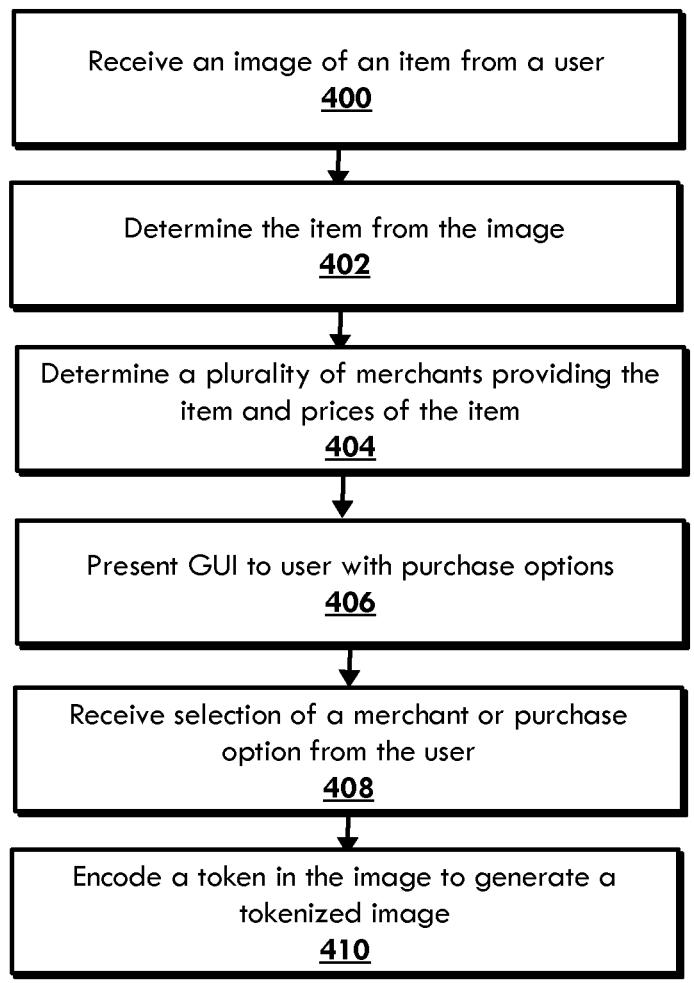
FIG. 4 is a flow diagram of a method for generating tokenized images according to non-limiting embodiments.

Referring now to FIG. 4, a method for generating a tokenized image is shown according to non-limiting embodiments. At a first step 400, an image of an item is received from a user as described in connection with step 300 of FIG. 3. At step 402, in embodiments in which the image is of the item, the item may be determined based on the image as described in connection with step 302 of FIG. 3. At step 404, a plurality of merchants is determined that provide the item for purchase. This determination may also identify the prices, purchase options, and other information associated with the item from each of a plurality of merchants. In some non-limiting embodiments, the merchants may be notified and provided with the opportunity to provide one or more offers, such as price adjustments, discounts, coupons, or the like to the user. In some non-limiting embodiments, the merchants may submit one or more bids to a bidding platform that determines which merchant is presented to the user. A bidding platform may be used to optimize the transaction based on price, geographic location, and/or merchant category, and helps protect against abusive activity such as spamming or a rogue merchant process. In this manner, and at step 406, the user may be presented with a GUI with a plurality of purchase options for the item. At step 408, a selection of a purchase option or specific merchant is received from the user through the GUI presented in step 406. At step 410, a token is encoded into the image as described in connection with step 310 of FIG. 3.

Although non-limiting embodiments have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for encoding account tokens in image files, comprising:
   receiving, from a user associated with an account identifier, an identification of an image;
   generating, with at least one processor, at least one token based on the account identifier of the user;
   generating, with at least one processor, at least one false token;
   encoding, with at least one processor, the at least one token and the at least one false token in the image, resulting in a tokenized image comprising the at least one token and the at least one false token; and
   communicating, with at least one processor, the tokenized image to a transaction processing system, wherein the transaction processing system is configured to conduct a transaction based on the tokenized image using the at least one token.

2. The computer-implemented method of claim 1, further comprising:
   extracting, with at least one processor, the at least one token from the tokenized image; and
   conducting, with at least one processor, a transaction based on the at least one token.

3. The computer-implemented method of claim 1, wherein encoding the at least one token comprises encoding the at least one token into RGB values of the image.

4. The computer-implemented method of claim 1, wherein encoding the at least one token comprises:
   encrypting the at least one token to produce encrypted data; and
   encoding the encrypted data into the image.

5. The computer-implemented method of claim 1, further comprising:
   detecting a transaction request using the at least one false token; and
   automatically deactivating the at least one token in response to detecting the transaction request using the at least one false token.

6. The computer-implemented method of claim 1, further comprising:
   capturing at least one image with a camera of a client device; and
   generating the image based on the at least one image.

7. The computer-implemented method of claim 1, wherein the image is a screenshot or an image downloaded from a webpage.

8. The computer-implemented method of claim 1, wherein the image comprises embedded merchant data or product data.

9. The computer-implemented method of claim 1, further comprising communicating, with at least one processor of a first client device, the tokenized image to a second client device including at least one processor, wherein the at least one processor of the second client device communicates the tokenized image to the transaction processing system.

10. A system for encoding account tokens in image files, comprising at least one processor programmed or configured to:
    receive, from a user associated with an account identifier, an identification of an image;
    generate at least one token based on the account identifier of the user;
    generate at least one false token;
    embed the at least one token and the at least one false token in the image, resulting in a tokenized image comprising the at least one token and the at least one false token; and
    communicate the tokenized image to a transaction processing system, wherein the transaction processing system is configured to conduct a transaction based on the tokenized image using the at least one token.

11. The system of claim 10, further comprising the transaction processing system, wherein the transaction processing system is programmed or configured to:
    extract the at least one token from the tokenized image; and
    conduct a transaction based on the at least one token.

12. The system of claim 10, wherein embedding the at least one token comprises encoding the at least one token into RGB values of the image.

13. The system of claim 10, wherein the at least one processor embeds the at least one token by:
    encrypting the at least one token to produce encrypted data; and
    encoding the encrypted data into the image.

14. The system of claim 10, wherein the at least one processor is further programmed or configured to:
    detect a transaction request using the at least one false token; and
    automatically deactivate the at least one token in response to detecting the transaction request using the at least one false token.

15. The system of claim 10, further comprising a client device including the at least one processor, wherein the at least one processor is further programmed or configured to:
    capture a photograph with a camera of the client device; and
    generate the image based on the photograph.

16. The system of claim 10, wherein the image is a screenshot or an image downloaded from a webpage.

17. The system of claim 10, wherein the at least one processor is further programmed or configured to communicate the tokenized image to a second client device including at least one processor, wherein the at least one processor of the second client device communicates the tokenized image to the transaction processing system.

18. A computer program product for encoding account tokens in image files, comprising at least one non-transitory computer-readable medium including program instructions that, when executed by at least one processor, cause the at least one processor to:
    receive, from a user associated with an account identifier, an identification of at least one image;
    generate at least one token based on the account identifier of the user;
    generate at least one false token;
    embed the at least one token and the at least one false token in the image, resulting in a tokenized image comprising the at least one token and the at least one false token; and
    communicate the tokenized image to a transaction processing system, wherein the transaction processing system is configured to conduct a transaction based on the tokenized image and the at least one token.

* * * * *